(12) United States Patent
Nemeth (10) Patent No.: US 11,240,999 B2
(45) Date of Patent: Feb. 8, 2022

(54) FISHING ROD

(71) Applicant: Szabolcs Nemeth, Pomaz (HU)

(72) Inventor: Szabolcs Nemeth, Pomaz (HU)

( * ) Notice: Subject to any disclaimer, the term of this patent is extended or adjusted under 35 U.S.C. 154(b) by 658 days.

(21) Appl. No.: 15/567,896

(22) PCT Filed: Apr. 7, 2016

(86) PCT No.: PCT/HU2016/000019
§ 371 (c)(1),
(2) Date: Oct. 19, 2017

(87) PCT Pub. No.: WO2016/170375
PCT Pub. Date: Oct. 27, 2016

(65) Prior Publication Data
US 2018/0103625 A1    Apr. 19, 2018

(30) Foreign Application Priority Data
Apr. 21, 2015 (HU) .................................. P1500177

(51) Int. Cl.
| A01K 87/06 | (2006.01) |
| A01K 87/04 | (2006.01) |
| A01K 87/02 | (2006.01) |
| A01K 87/08 | (2006.01) |

(52) U.S. Cl.
CPC .............. *A01K 87/06* (2013.01); *A01K 87/02* (2013.01); *A01K 87/04* (2013.01); *A01K 87/08* (2013.01)

(58) Field of Classification Search
CPC ........ A01K 87/00; A01K 87/02; A01K 87/04; A01K 87/06; A01K 87/08
See application file for complete search history.

(56) References Cited

U.S. PATENT DOCUMENTS

| 1,837,623 | A | * | 12/1931 | Mansfield | ............... | A01K 87/06 43/22 |
| 2,104,495 | A | * | 1/1938 | O'Brien, Jr. | ........... | A01K 87/06 43/22 |
| 2,753,646 | A | * | 7/1956 | Colmery | ................ | A01K 87/06 43/22 |
| 3,216,144 | A | * | 11/1965 | Vojinov | ................. | A01K 87/00 43/18.1 R |
| 3,811,215 | A | * | 5/1974 | Fleischer | ............... | A01K 87/02 43/18.1 CT |
| 3,988,850 | A | * | 11/1976 | Steinman | ............... | A01K 87/00 43/25.2 |
| 4,050,179 | A | * | 9/1977 | Johnson | ................ | A01K 87/06 43/22 |

(Continued)

*Primary Examiner* — Marc Burgess
(74) *Attorney, Agent, or Firm* — Millen, White, Zelano & Branigan, PC; Ryan Pool (57) ABSTRACT

The subject of the invention relates to a fishing rod that has a handle (1), a shaft (2), with tip top guide (7), containing a spring, a reel support seat (3) running between the handle (1) and the shaft (2), and reel support rings (26, 27) located on the seat (3), as well as a trigger (11) for using top-mounted reels. The essence of the invention is that the handle (1) is connected to the seat (3) and the seat (3) to the shaft (2) with releasable connections, and the seat (3) is established to accommodate both bottom-mounted and top-mounted reels (40) and also to accommodate a trigger (11) that may be attached and removed from the seat (3) for operating top-mounted reels (40).

12 Claims, 10 Drawing Sheets

(56) References Cited

U.S. PATENT DOCUMENTS

| | | | | |
|---|---|---|---|---|
| 4,229,898 A * | 10/1980 | Urakami | A01K 87/06 | 43/21.2 |
| 4,398,369 A * | 8/1983 | Wiebe | A01K 87/08 | 43/18.1 R |
| 4,432,155 A * | 2/1984 | Miller | A01K 87/06 | 43/22 |
| 4,485,580 A * | 12/1984 | Ohmura | A01K 87/06 | 43/22 |
| 4,693,029 A * | 9/1987 | Yamamoto | A01K 87/06 | 43/22 |
| 4,771,566 A * | 9/1988 | Ohmura | A01K 87/08 | 43/23 |
| 4,796,373 A * | 1/1989 | Struntz | A01K 87/08 | 43/22 |
| 5,875,581 A * | 3/1999 | Yasui | A01K 87/06 | 43/20 |
| 5,904,000 A * | 5/1999 | Ohmura | A01K 87/06 | 43/22 |
| 6,115,955 A * | 9/2000 | Sledge | A01K 87/08 | 43/18.1 HR |
| 6,381,898 B1 * | 5/2002 | Lee | A01K 87/06 | 43/22 |
| 6,922,936 B2 * | 8/2005 | Markley | A01K 87/02 | 403/349 |
| 7,086,195 B2 * | 8/2006 | Borgeat | A01K 87/06 | 43/18.1 CT |
| 7,533,484 B2 * | 5/2009 | Markley | A01K 87/04 | 43/18.1 HR |
| 8,413,366 B2 * | 4/2013 | Malcarne | A01K 87/02 | 43/18.1 R |
| 8,919,031 B2 * | 12/2014 | Malcarne | A01K 87/06 | 43/18.1 CT |
| 2006/0288630 A1 * | 12/2006 | Lin | A01K 87/06 | 43/22 |
| 2017/0112113 A1 * | 4/2017 | Huang | A01K 87/02 | |

\* cited by examiner

FISHING ROD

CROSS-REFERENCE TO RELATED APPLICATIONS

This application is a U.S. National Stage of PCT/HU2016/000019, filed Apr. 7, 2016, which claims priority of Hungarian Patent Application No. P1500177, filed Apr. 21, 2015, each of which is incorporated herein by reference.

The invention relates to a fishing rod, especially for spin fishing, which has a handle, a shaft, with tip top guide, containing a spring, a reel support seat running between the handle and the shaft, and reel support rings located on the seat, as well as a trigger for using top-mounted reels.

Angling is a favoured and widespread hobby and/or sport activity the fundamentally important devices for which are fishing rods, and numerous versions of these are manufactured and distributed.

In Europe and Hungary, for example, it is fishing rods with bottom-mounted reels that have become popular ("spinning" system), but fishing rods designed for accommodating top-mounted reels ("casting" system) are also increasingly popular. In this case a trigger is located under the reel seat, while in the "spinning" system there is no need for this. Fishing rods with bottom-mounted reels have shafts assembled from several pieces or have a telescopic construction, to which the reel must usually be attached at the location where used. As a consequence of these factors these traditional fishing rods have a significant space demand during storage and transportation to a smaller or greater degree, and depending on the actual length of the rods their use onsite requires space to a smaller or greater degree, and the local conditions (e.g. bushes, trees, etc.) may limit their use.

As a result of efforts directed at overcoming these disadvantages so-called compact fishing rods, packrods appeared overseas in the 1930s, which were spring-shaft devices made from spring steel with a cast aluminium handle. Due to the spring shafts containing usually four-eight spiral turns or a spring-bend the total rod length dropped radically. Due to the small size of such fishing rods they are easy to store and transport and make angling possible in places where the long, traditional rods cannot be used, e.g. shores of watercourses overgrown with thick vegetation or sailboats where the rigging prevents angling with long rods.

Such a spring shaft fishing rod with top-mounted reel containing an upward standing tip top is presented in U.S. Pat. Nos. 6,922,936 and 6,931,781, which has a handle with a trigger in a fixed position and a reel support structure, to which a top-mounted reel with a release button may be fixed in a known way. The purpose of the trigger established as a single member with the handle is that at the moment of casting, when the angler presses the release button on the rear of the reel with his thumb making it possible for the fishing line to run freely, he is able to stably hold the handle with another finger, and the cast is safe and can easily directed. Therefore, the trigger has a support button function providing counter-support during casting.

With respect to its fundamental structure, the fishing rod with top-mounted reel according to U.S. Pat. No. 7,168,201 is the same as that presented above; here the spring shaft is connected with a releasable connection to the reel seat and structure, which has a sheath into which the inner end of the shaft supplied with protuberances may be pushed against the force of a coil spring, and by twisting the shaft the protuberances fit into seats and fix the shaft.

Spring shaft fishing rods are also presented in patent specifications U.S. Pat. Nos. 7,454,862 and 7,533,484. These use bottom-mounted reels; here the shafts are fitted with special line-guide devices located beside the springs, which make the guiding function, otherwise performed by the spiral turns of the spring, more reliable.

The either top-mounted or bottom-mounted reels—"casting" or "spinning" system—of spring shaft rods presently known of, primarily used for spin fishing and presented in detail above may only be fixed in the way designed, in other words top-mounted or bottom-mounted. It is completely obvious that in the case of the "casting" system, the trigger established as a single member with the handle, which must be bottom-mounted and protrude downwards, excludes the possibility of fitting a bottom-mounted reel, but in the lack of a trigger the aforementioned bottom-mounted reel rods are not suitable for angling with a top-mounted reel ("casting"), and in such a "spinning" system the tip top may only be bottom-mounted.

As fishing rods with top-mounted reels are primarily excellent for spin fishing, they may be used to better effect than traditional rods with bottom-mounted reels significantly more widespread in Europe, and many anglers gladly use both methods even on the same day out fishing and at the same fishing location, for which the angler must take several types of fishing rod with him, which naturally involves a greater space demand, a greater transportation-handling weight and, in a given case, time consuming and complex assembly work.

The task to be solved with the invention according to this is to provide a spring shaft fishing rod that has small dimensions, is compact, requires little space, is light in weight and suitable for angling with either a top-mounted or bottom-mounted reel with the same spring shaft.

The invention is based on the recognition, that if the reel support seat has surfaces established opposite each other which are created to be suitable for fitting a reel foot, and the reel support seat may be connected both to the inner end of the shaft and to the handle with a releasable connection, the seat and the shaft tip top may be twisted and fixed in a position suitable for either a top-mounted or bottom-mounted reel, and the tip top may be twisted into an upwards or downwards position according to the actual reel position and fixed. It was also recognised that if the trigger is combined with a ring that may be guided onto, slid along and fixed onto the reel support seat, as a consequence of the aforementioned releasable connections, the trigger maybe removed from the seat for bottom-mounted reels, and for angling with top-mounted reels, the trigger may be guided onto the seat and fixed in a position protruding downwards.

On the basis of the above recognitions the set task according to the invention was solved with a fishing rod defined with claim 1 specially suitable for spin fishing, which has a handle, a shaft, with tip top guide, containing a spring, a reel support seat running between the handle and the shaft, and reel support rings located on the seat, the essence of which fishing rod is that the handle is connected to the seat and the seat to the shaft with releasable connections, and the seat is established to accommodate both bottom-mounted and top-mounted reels and also to accommodate a trigger that may be attached and removed from the seat for operating top-mounted reels.

The preferable embodiments of the fishing rod according to the invention are defined in the subclaims.

In the following the invention is presented on the basis of the attached drawings, which include a preferable embodiment of the fishing rod and a number of structural detail solutions.

Figure 1:
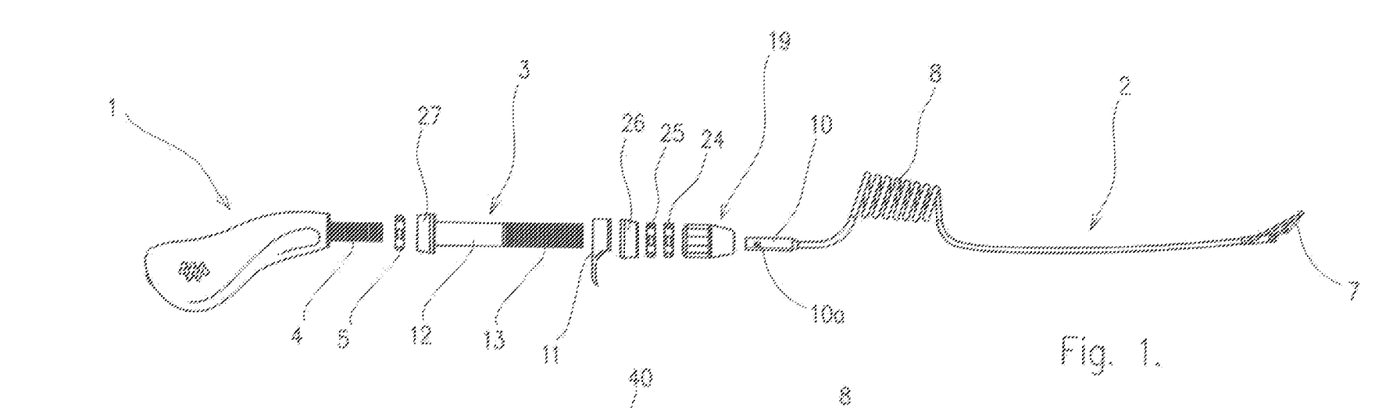
FIG. 1 shows the fishing rod dismantled in side view.
Figures 2, 3:
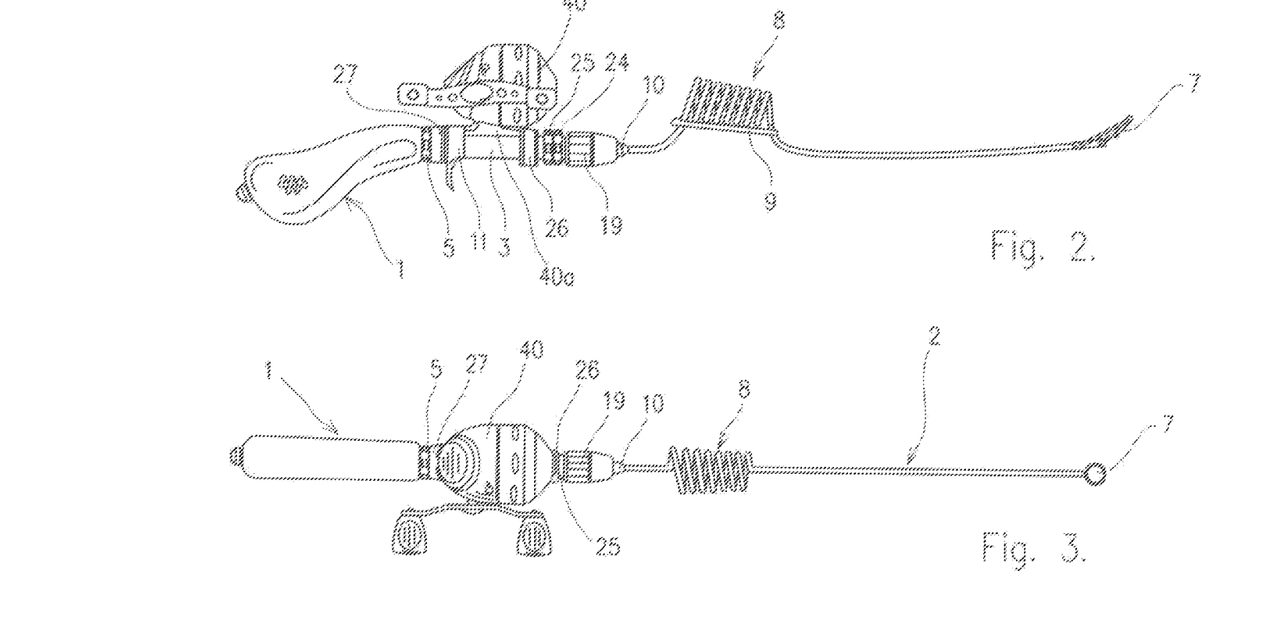
FIG. 2 shows the fishing rod according to FIG. 1 assembled.
FIG. 3 shows the fishing rod in FIG. 2 in top view.

The embodiment of the fishing rod according to the invention illustrated in FIGS. 1-3 has a handle 1, shaft 2—a spring shaft preferably made from stainless steel—and a reel support seat 3.

The shaft 2 has a tip top 7 known in itself and a spiral spring 8 protruding to the side from the longitudinal axis of the shaft 2, furthermore, it has a connection member 10 at its end opposite to the tip top 7, in other words at the inner end, which is firmly connected to the shaft 2, but it may also be established as a single member with it. The cylindrical connection member 10 has two outwardly protruding protrusions 10a, 10b located opposite one another near to the end facing towards the handle 1. A detailed presentation of the flexible auxiliary guide ring stretched onto the outside of the spring 8 and of its role will be provided later on. It should be noted that the spring 8 protrudes in the direction as compared to the straight sections of the shaft 2 in which the tip top 7 protrudes—in a known way.

A threaded shaft 4 forming a solid unit with the handle 1 protrudes from the inner end of the handle 1, due to which the reel support seat 3 that may be connected to the connection member 10 of the shaft 2 can be firmly fixed.

Figure 4:
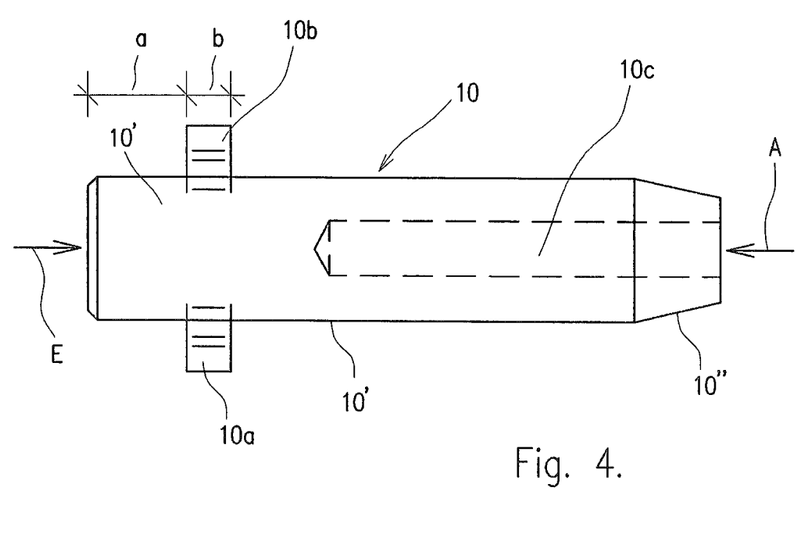
FIG. 4 shows the connection member according to FIG. 1 in greater scale.
Figure 5:
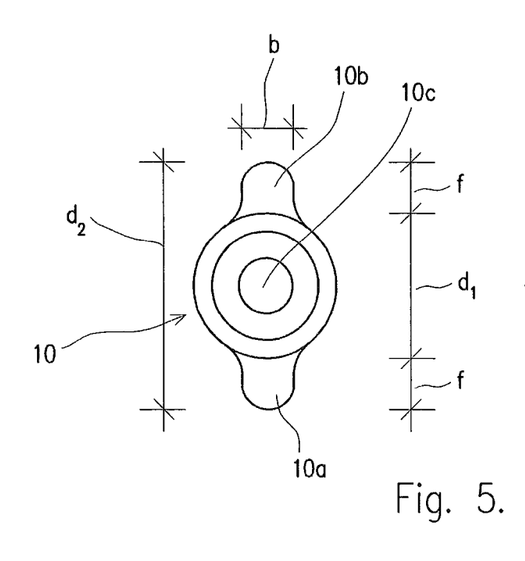
FIG. 5 shows the view seen from the direction of arrow A indicated in FIG. 4.
Figure 6:
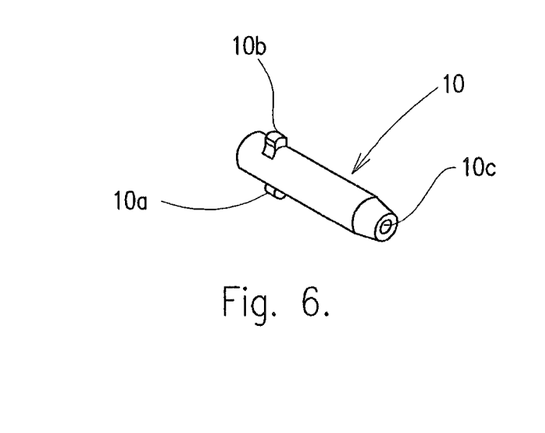
FIG. 6 shows the connection member according to FIGS. 4 and 5 in smaller scale in perspective view.

A preferable embodiment of the connection member 10 of the shaft 2 is presented through FIGS. 4-6. In the case according to this embodiment the cylindrical connection member 10 contains a hole 10c, or bore running in the longitudinal direction of the connection member 10, and the inner end of the shaft 2 is fixed in this with, for example, adhesive. The external cylindrical surface 10' of the connection member 10 connects to the shaft 2 with a conical surfaced transition 10". The opposing outwardly protruding protrusions 10a, 10b, here at an angle of 180° to each other, are located at a distance a from the end of the connection member 10 facing the handle 1. The upper end of the protrusions 10a, 10b with width b are rounded off, as can be easily seen in FIGS. 5 and 6, and at the bottom they meet the external surface of the connection member 10 with curved sections. In FIG. 5 the external diameter of the connection member 10 has been indicated with reference number $d_1$ and its total width including the two protruding protrusions 10a, 10b with $d_2$, while the protrusions 10a, 10b each have a height J.

Figures 7, 8, 9A, 9B, 9C:
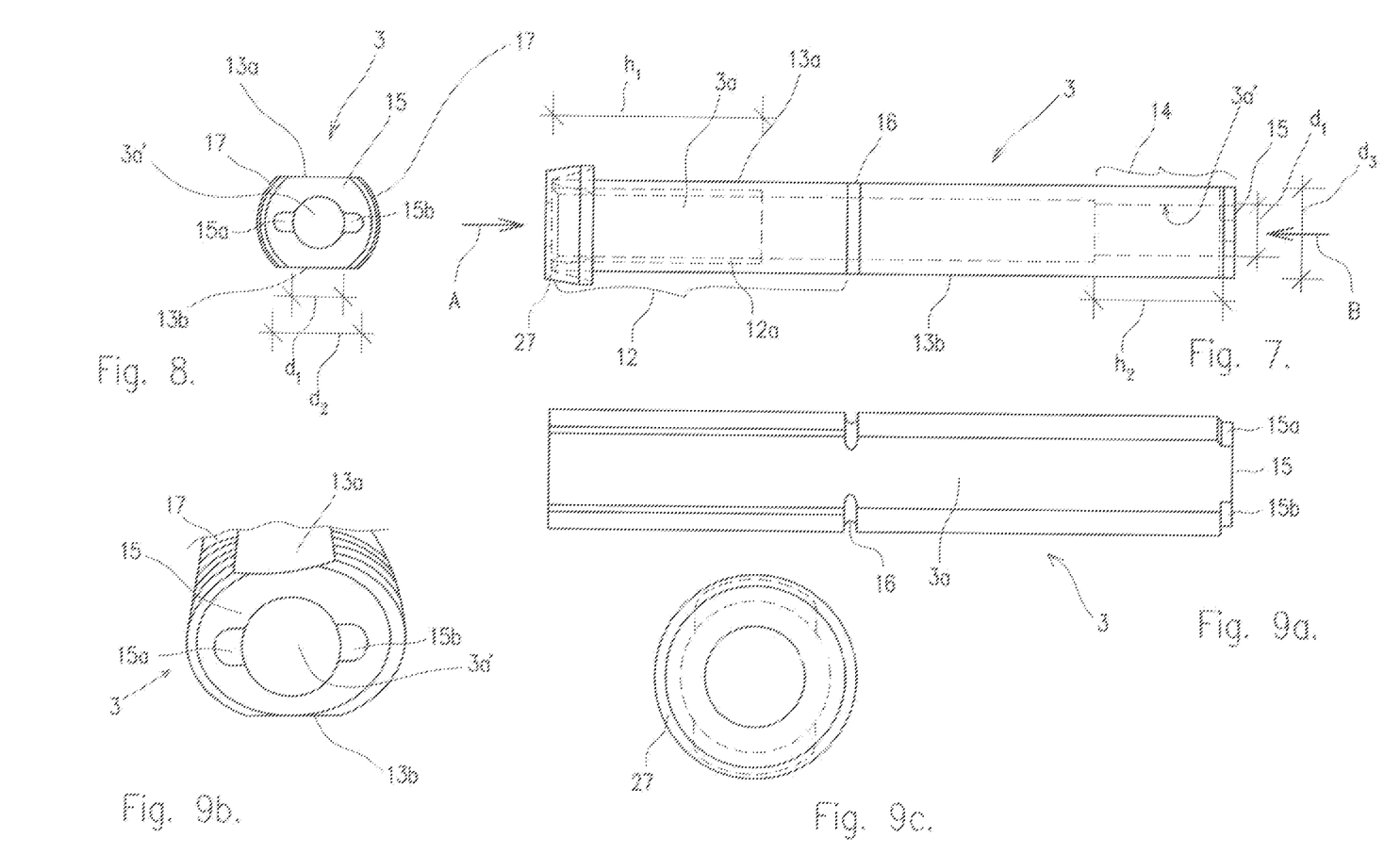
FIG. 7 shows the side view of the reel support seat according to FIG. 1 in larger scale.
FIG. 8 shows the view seen from the direction of arrow B indicated in FIG. 7.
FIG. 9a shows the longitudinal section of the real support seat according to FIG. 7 without the rear reel support ring FIG. 7.
FIG. 9b shows a perspective view of the front end part of the reel support seat in greater scale.
FIG. 9c shows the view seen from the of the arrow A indicated in FIG. 7.
Figure 10:
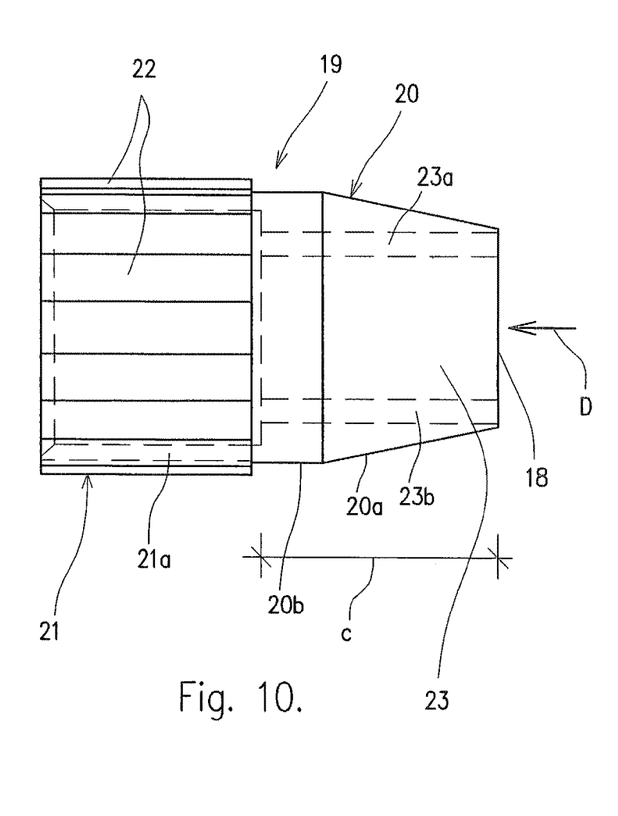
FIG. 10 shows the side view of the fixing sheath according to FIG. 1 in greater scale.

With reference to FIGS. 7-9, in the following the reel support seat 3 of the fishing rod according to FIGS. 1-3 is presented in detail. Accordingly a hole 3a with a circular cross-section runs through the seat 3, in other words, the seat 3 is essentially established as a thick-walled tube, the external surface of which contains planar faces 13a, 13b running parallel to each other on the top and bottom of the entire length of the seat 3. Apart from the seat's 3 function of supporting the reel 40 known in itself and indicated in FIGS. 2 and 3—the reel 40 may be practically any type of reel commercially available, the foot 40a of which always fits onto or rests on one of the planar faces 13a, 13b—it also serves for connecting the connection member 10 of the shaft 2 as well as for connecting with the releasable connection of the handle 1. For this the section 12 of the seat 3 has an internal thread 12a for a length $h_1$, into which the threaded shaft 4 of the handle 1 may be screwed—preferably with the use of a locknut 5 (FIGS. 1-3) and washers (not illustrated) on its two sides, and with this the handle 1 may be connected to the seat 3 with a releasable but stable connection. The one, rear reel support ring 27 is stably fixed on the end of the seat 3 facing the handle 1, which will be presented in detail later.

In the interest of forming the releasable connection of the end of the seat 3 facing the shaft 2 to the connection member 10 of the shaft 2 it has an end part 14 formed in which a hole with diameter $d_1$ runs for the length $h_2$; this dimension $d_1$ complies with the diameter $d_1$ indicated in FIG. 5, therefore it is suitable for accommodating the cylindrical connection member 10 of the shaft 2. The diameter of the entire virtual circular cross-section of the seat 3 is indicated in FIG. 7 with reference $d_3$. It is obvious that the length $h_2$ must exceed the length of the connection member 10 indicated with reference number 10' in FIG. 4 extending inwards beyond the protrusions 10a, 10b.

Two seatings 15a, 15b are formed in the façade surface 15 of the seat 3, where the hole 3a' emerges, opposite each other on the two sides of the edge of this hole, the shape and dimensions of which preferably completely comply with the shape and dimensions of the aforementioned protrusions 10a, 10b, in such a way that when the user guides the connection member 10 into the hole 3a of the seat 3, the protrusions 10a, 10b precisely fill the seatings 15a, 15b. A groove 16 runs along the central section of the seat 3 and the cylindrical side surfaces of the seat 3 running from this groove 16 up to the façade surface 15 have threads 17 that run between the upper and lower planar faces 13a, 13b established along the entire length of the seat 3.

The structure of the fixing sheath 19, or adapter according to FIGS. 1-3 is shown in FIGS. 10-13 in greater scale, which has a guide section 20 and a fixing section 21, which has an internal thread 21a.

Figures 11, 13:
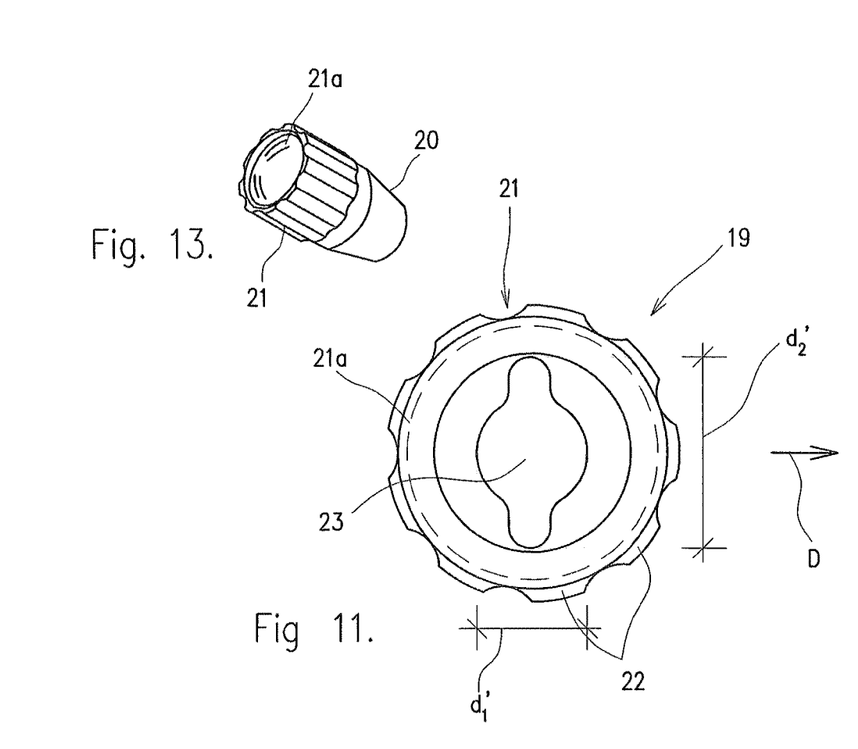
FIG. 11 shows the view seen from the direction of arrow D indicated in FIG. 10.
FIGS. 12 and 13 show the fixing sheath according to FIGS. 10 and 11 in outline perspective view in smaller scale.
Figure 12:
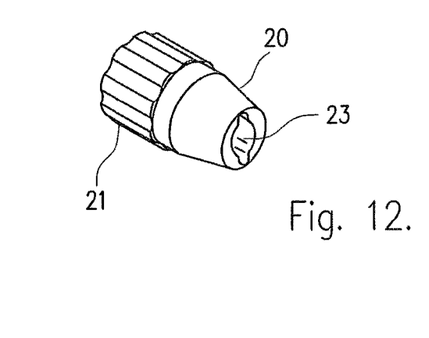

The guide section 20 with length c has a widening external conical surface 20a starting from the introductory opening 18 and a cylindrical surface 20b, which is supplied with external ribs 22—ribbing—or knurling in the interest of easier turning of the fixing sheath 19. A hole 23 with a profiled cross-section runs through the guide section 20, the cross-sectional dimensions and shape of which comply with the view of the connection member 10 of the shaft 2 seen from the direction of the arrow E marked in FIG. 4, therefore the dimensions $d'_1$ and $d'_2$ shown in FIG. 11 are substantially identical to the dimensions $d_1$, $d_2$ shown in FIG. 5, or rather they exceed them to the extent to permit the connection member 10 being inserted through the hole 23.

The fixing section 21 of the fixing sheath 19 has an internal thread 21a, which matches the external thread 17 of the reel support seat 3 so that the fixing sheath 19 can be screwed onto the external section 13 of the seat 3 and screwed off it.

Figure 14:
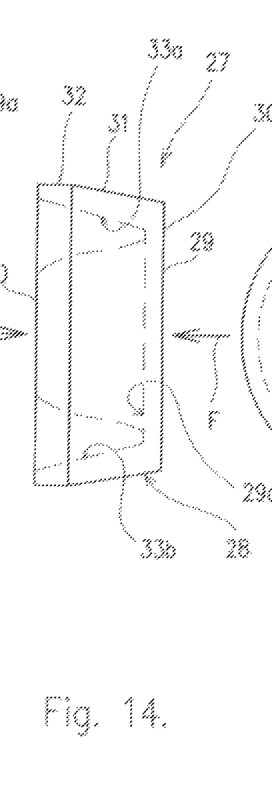
FIG. 14 shows the rear reel support ring according to FIG. 1 in side view.
Figure 15:
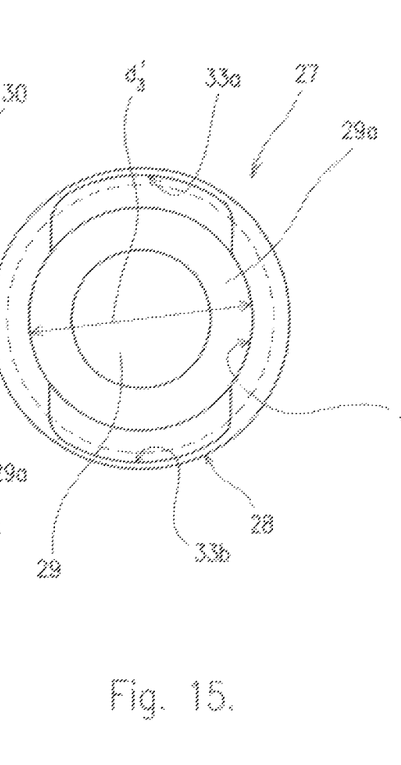
FIG. 15 shows the view seen from the direction of arrow E indicated in FIG. 14.
Figure 16:
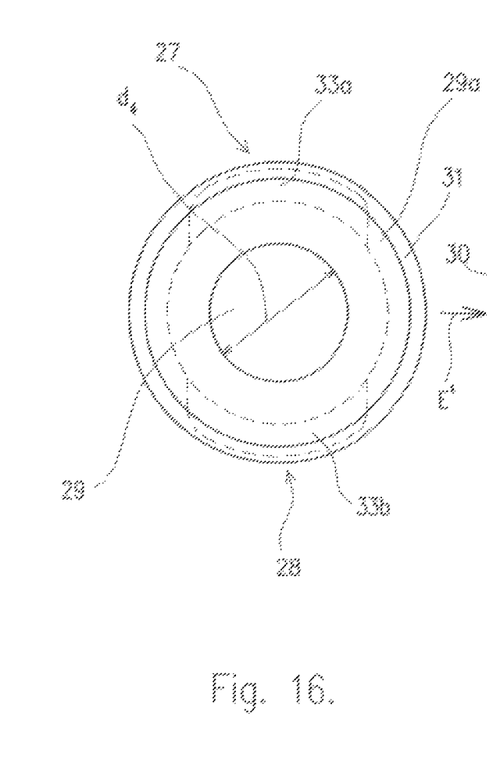
FIG. 16 shows the view seen from the direction of arrow F indicated in FIG. 14.

The rear reel support ring 27 already mentioned is shown in FIGS. 14-16, which is securely fixed on the end of the seat 3 near the handle 1 in a position facing forwards. The ring body 28 of the reel support ring 27 has a rear opening 29 and front opening 30. The outside of the ring body 28 has a conical surface 31 and a cylindrical surface 32. The diameter $d'_3$ of the opening 29 indicated in FIG. 15 matches the diameter $d_3$ of the seat 3 indicated in FIG. 7. However, the diameter $d_4$ indicated in FIG. 16 is smaller than the diameter $d_3$ and a shoulder 29a running around inside the opening 29 surrounds it, to which the inner end of the seat 3 fits. The rear side of the ring 27 rests on a locknut 5—preferably with the insertion of a washer. The diameter $d_4$ should be preferably selected so that the threaded shaft 4 of the handle 1 can be guided through it.

Seatings 33a, 33b with identical shape and dimensions are formed facing one another in the ring body 28 of the reel support ring 27 that end at the front end facing the shaft 2, which extend up to the shoulder 29a and their cross-section is selected, e.g. a flat U-shape, so that they are able to accommodate the end of the foot of fishing reels commercially available and grip it. Inwards the U-shaped cross-section may have a slightly continuously narrowing size for the purpose of aiding the gripping of the reel foot end.

Figure 17:
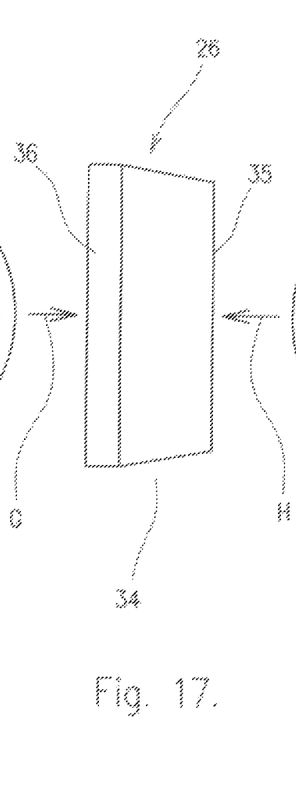
FIG. 17 shows the side view of the front reel support ring.
Figure 18:
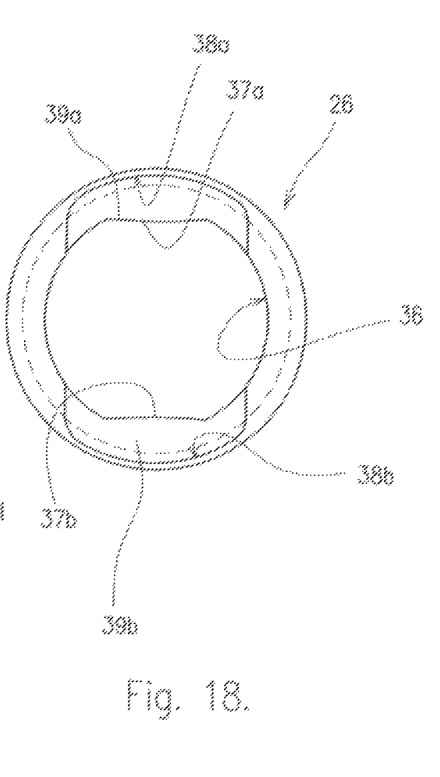
FIG. 18 shows the view seen from the direction of arrow G indicated in FIG. 17.
Figures 19, 19A:
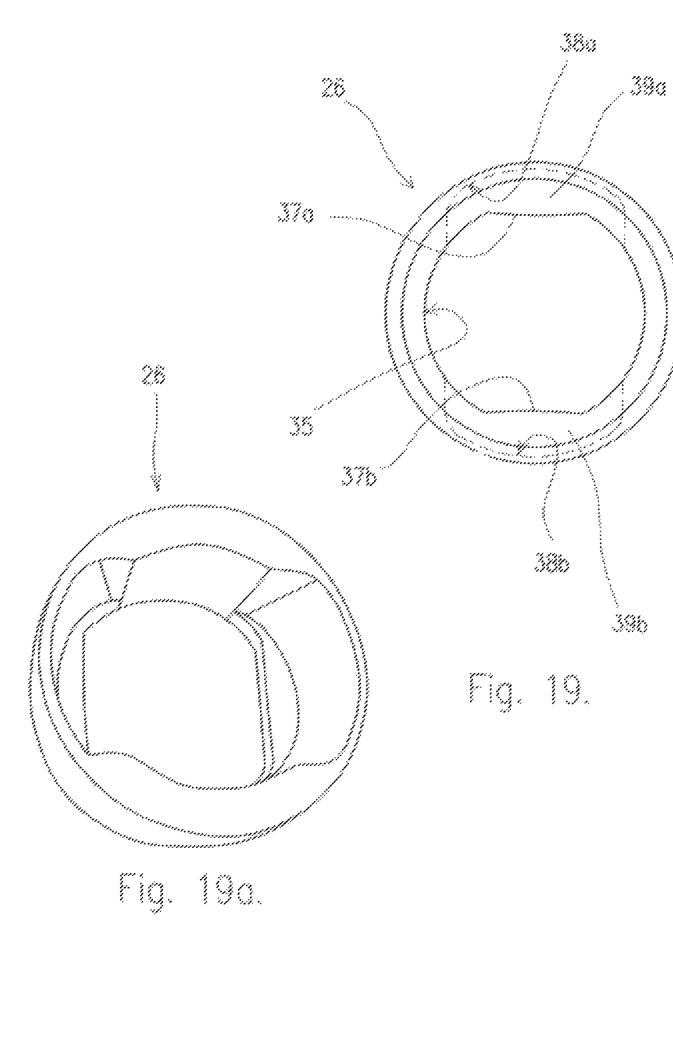
FIG. 19 shows the view seen from the direction of arrow H indicated in FIG. 17.
FIG. 19a shows a perspective view of the part of the support ring indicated in FIG. 19.
Figures 20, 20A, 21, 22:
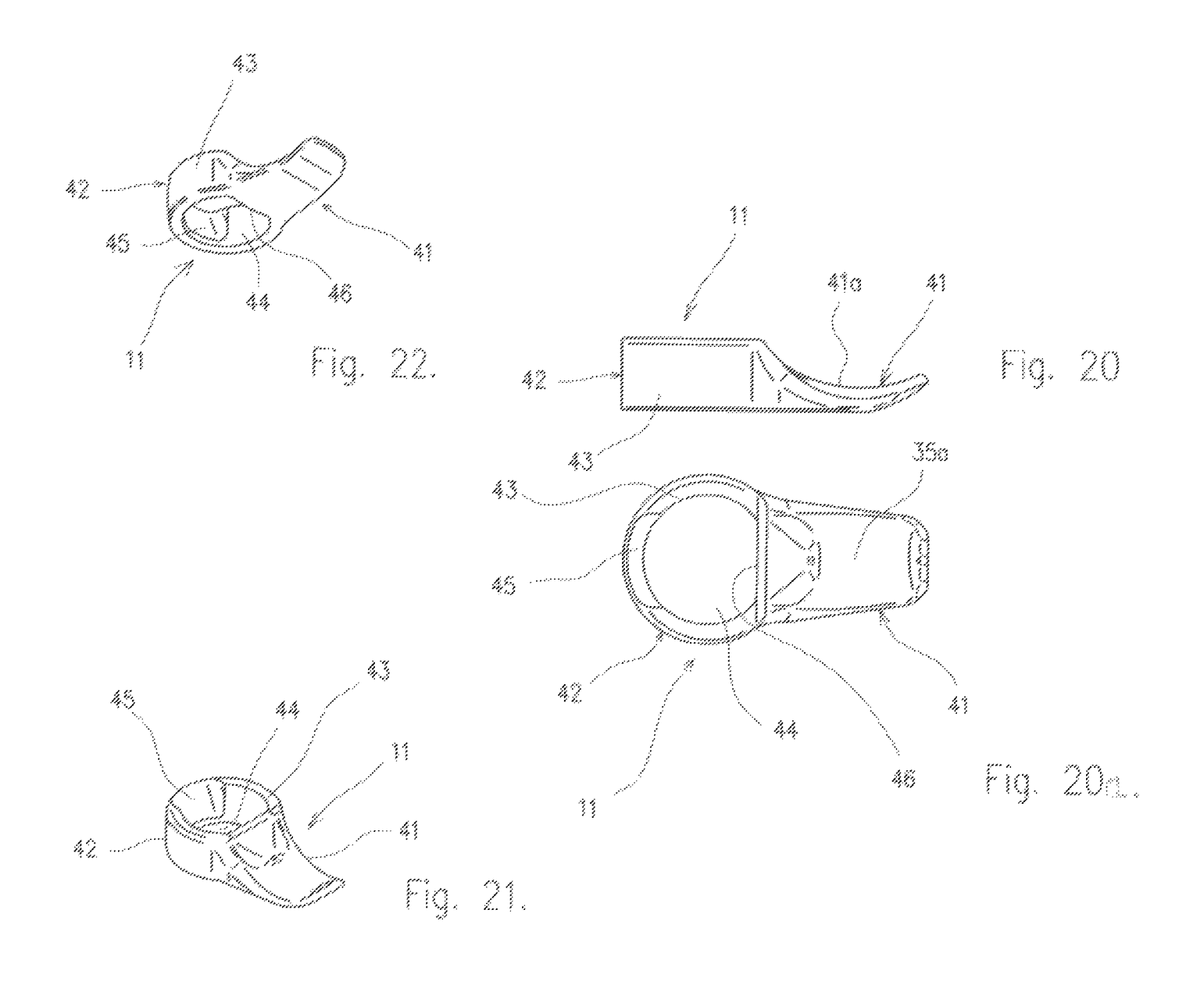
FIG. 20 shows the trigger according to FIG. 1 in side view in greater scale.
FIG. 20a shows the top view of the trigger according to FIG. 20.
FIGS. 21 and 22 show the trigger according to FIGS. 17 and 18 in smaller scale perspective view.

The front reel support ring 26, i.e. the one closer to the shaft 2 is shown in larger scale in FIGS. 17-19, which with regard to its fundamental structure is substantially identical to the rear reel support ring 27. In this case the opening 36 of the ring body 34 facing the handle 1 and the opening 35 facing the shaft 2 have the same cross-section, which complies with the cross-section of the reel support seat 3; as they must be able to slide along the seat 3 they are slightly larger than that. The planar inner sides 37a, 37b of the ring 26 move in parallel with and along the planar faces 13a, 13b of the seat 3 when the user of the fishing rod guides the ring 26 onto the seat 3 and the same is valid with respect to the curved surfaces on the two sides of the ring 26 and the curved surfaces of the seat 3 without the thread. The ring body 34 has the same seatings 38a, 38b designed for accommodating the reel foot ends as ring 27; these start from the opening 36 facing the handle 1 and extend to the shoulders 39a, 39b—stops—protruding into the opening 35 from below and above, which set the limit of the degree to which the reel foot can be pushed in.

A preferable embodiment of the trigger 11 can be seen in FIGS. 19-22. The trigger 11 has a button 41 and a ring 42 established as a single member with it, which can be guided along the entire length of the seat 3. As mentioned in the introduction, the function of the trigger 11 is to provide a counter-support for the angler's index finger reaching down when the angler presses the reel release button in the case of the use of a top-mounted reel; therefore the curved surface 41a of the trigger 11 is formed in accordance with the shape of the finger.

The ring 42 of the trigger 11 must function as a reel support ring for top-mounted reels, actually it must perform the task of the rear reel support ring 27 according to FIGS. 14-16. For this the lower part of the opening 44 passing through the ring body 43 neighbouring the button 41 is formed with a planar face 46, which slides along the lower face 13b of the seat 3 when the trigger 11 is fitted. Opposite to the face 46 in the ring body 43, in other words at the top, a seating 45 is formed for accommodating the reel foot end, the dimensions and shape of which match the dimensions and shape of the seatings 33a, 33b and 38a, 38b of the reel support rings 26 and 27, and the opening of the seating 45 faces in the direction of the shaft 2.

The assembly of the fishing rod for angling with a top-mounted reel, primarily for spin fishing, from the part-units and elements presented in detail above takes place as follows:

the threaded shaft 4 of the handle 1 is passed through the opening 29 of the reel support ring 27 fixed at the inner end of the reel support seat 3, to which shaft 4 the locknut 5 has been previously screwed to its position shown in FIGS. 2 and 3, then the seat 3 is screwed onto the shaft 4. With this the handle 1 and the seat 3 are securely connected to each other. In the next step the trigger 11 is guided onto the seat 3, and the trigger rests on the façade face of the ring 27. The front reel support ring 26 is guided onto the outer threaded end of the seat 3, so that its opening 36 faces towards the seating 45 established in the ring body 44 of the ring 42 of the trigger 11; therefore this seating 45 and the seating 28a (FIGS. 18 and 19) are located opposite each other. The distance between the ring 26 and the ring 42 of the trigger 11 is to be selected to exceed the length of the foot 40a of the reel 40 to be fixed to the fishing rod as shown in FIGS. 2 and 3.

Following this the connection member 10 of the shaft 2 is guided on the profiled opening 23 of the fixing sheath 19 (adapter) and after screwing the locknuts 25 and 24 onto the seat 3, the connection member 10 is pushed into the opening 3a of the seat 3 until the protrusions 10a, 10b are accommodated in the seatings 15a, 15b, see FIGS. 7-9b. Following this the connection member 19 is screwed onto the threaded end section 14 of the seat 3 (FIGS. 7 and 8) and with this the shaft 2 is securely fixed to the seat 3. With this the fishing rod is ready for use as a functional unit. The last step involves the fitting of the reel 40—in a way known of in itself —, its foot is fitted to the upper planar face 13a of the reel support seat 3, the one reel foot end is fitted into the seating 45 of the ring 42 of the trigger 11, then the outer reel support ring 26 is guided onto the other end of the foot and then the entire reel 40 is fixed onto the fishing rod with the locknuts 24,25. As it can be seen in FIGS. 1 and 3, the tip top 7 protrudes upwards in accordance with a top-mounted reel system.

If the fishing rod is to be used with a bottom-mounted reel, the fixing sheath 19, the locknuts 24, 25, the outer reel support ring 26 and the trigger 11 must be screwed off the seat 3, then these must be screwed back on when the outer reel support ring 26 is in position opposite the reel support ring 27 in a fixed position on the seat 3, and then the one reel foot end fits into the lower seating 33b of the reel support ring 27 and the other reel foot end fits into the lower seating 38b of the outer ring 26, and by tightening the reel foot with the locknuts 24, 25, the fishing rod with bottom-mounted reel is ready for use. At this time the tip top 7 protrudes downwards.

Figure 23:
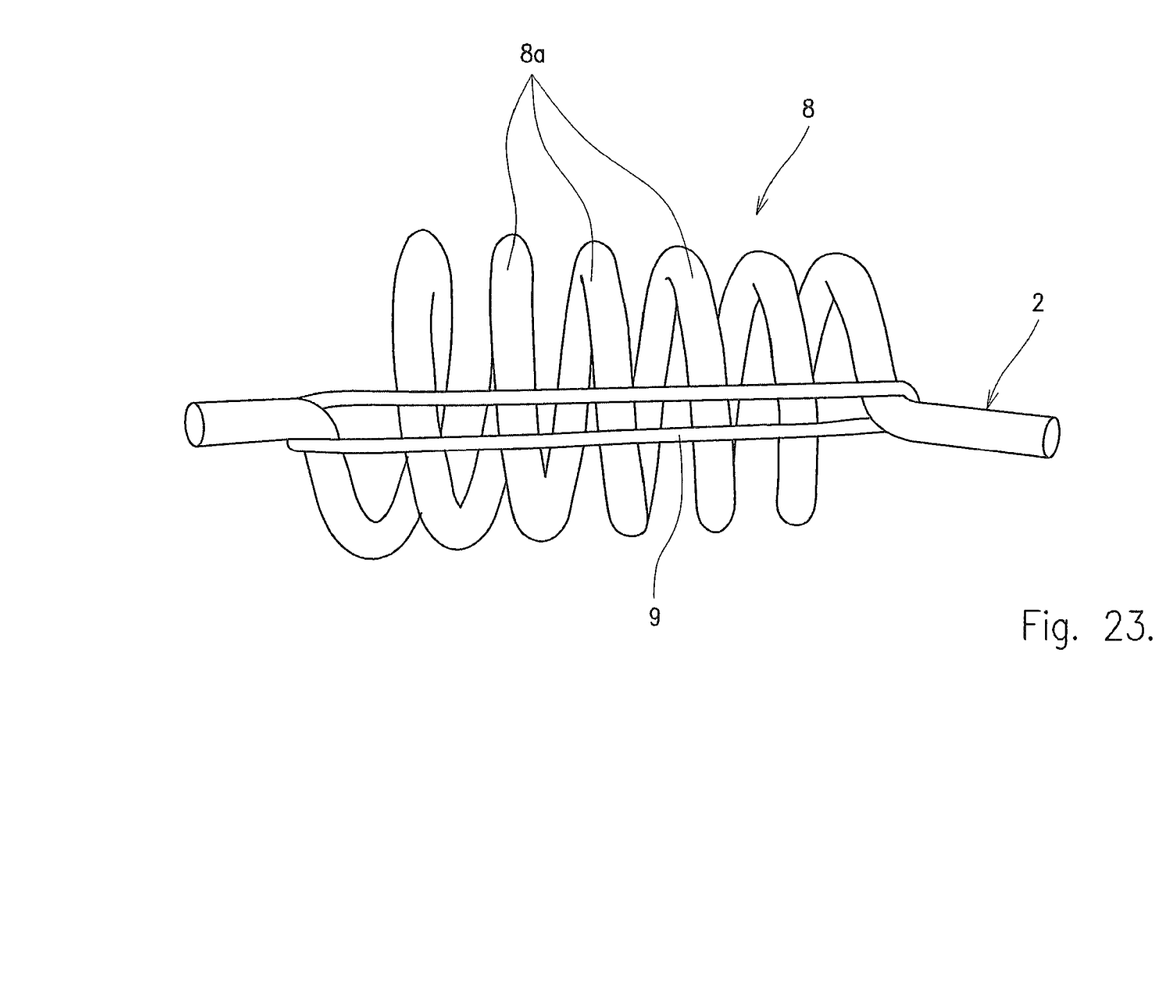
FIG. 23 shows a large scale perspective view of the spring according to FIGS. 1-3 supplemented with a line guide auxiliary ring.

In the case of the use of a bottom-mounted reel, the line running from it may possibly get tangled in the spring 8. Although a rare event, the line may run in between the spring coils 8a, which are indicated in FIG. 23 with reference number 8a, which may represent a problem in the case of front drag reels, as during casting the line spins off the spool in large circular motions. In the case of other types of reel, the line does not or only very rarely slips between the spring coils 8a. According to the invention with the help of the flexible auxiliary line guide ring 9 shown in FIGS. 2, 3 and 8, e.g. a rubber ring of the appropriate thickness, which is stretched onto the outer spring coils, and essentially falls in the continuation of the straight parts of the shaft 2, the "entrances" to the spring coils 8a, in other words the gaps between the spiral turns are closed off, therefore the line cannot get in between spring coils 8a. As a consequence of the flexibility of the auxiliary ring 9, when the spring 8 bends it does not move out of place and follows the motion of the spring 8.

The handle 1 shown in FIGS. 1-3 is basically for use with top-mounted reels, but, naturally, in accordance with that described above it can also be used for angling with bottom-mounted reels without any problem. In all cases the handle 1 must be completely screwed into the seat 3; the locknut 5 is essential for the precise positioning and fixing of the handle 1, as the specially shaped handle 1 according to FIGS. 1-3 is not a rotary body, it only has a single suitable position, which could not be set precisely without the locknut. In the case of top-mounted reels (FIGS. 1,2 and 3) the reel is released with the thumb when casting, and then the fishing rod is held by the handle 1 and used.

Figure 24:
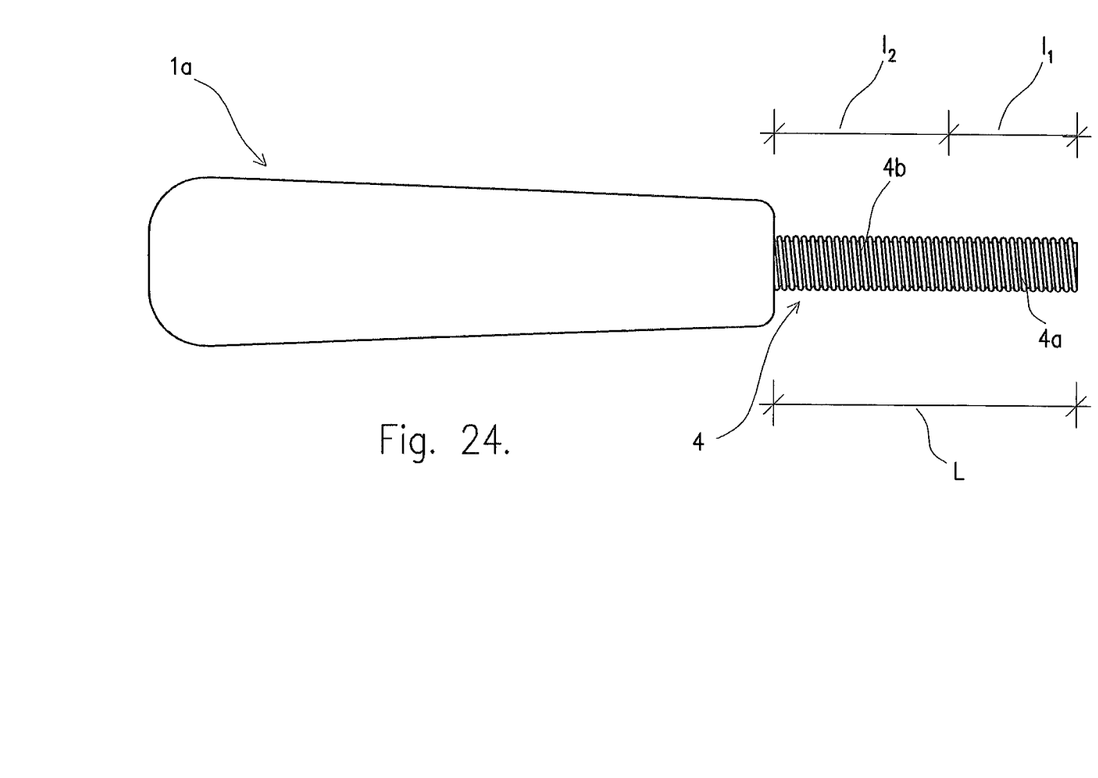
FIG. 24 shows the side view of a cylindrical handle with a threaded shaft.

The handle 1a shown in FIG. 24 used for angling with a bottom-mounted reel is a rotary body. In this case the rod is held at the reel seat, when casting the bail is opened, and until released—until the rod is swung—the wound line is held with the finger.

Therefore, the cylindrical handle 1a according to FIG. 24 is for supporting the fishing rod under the lower arm, with this taking the load off the wrist. The longer the handle 1a, the easier it is to counterbalance when playing a fish.

As a consequence, in the case of a relatively short fishing rod slightly extending the length of the cylindrical handle 1a also has significance. The system according to the invention provides the possibility for this by establishing a threaded bore 12a in the seat 3 with such a length that complies with the total length L of the threaded shaft 4 shown in FIG. 24.

However, in order to establish a securely fixed connection between the shaft 4 and the seat 3, it is sufficient if only the section 4a with length of the shaft 4 connects to the thread 12a of the bore of the seat 3, therefore it is sufficient to screw the shaft 4 into the seat 3 up to this length $l_1$. This, however, means that with the remaining length $L-l_1=l_2$ the length of the cylindrical handle 1a may be extended by a maximum of length 12, which has been illustrated through FIGS. 25 and 26, in which the structural elements presented previously have been marked with the reference numbers already used.

Here a bottom-mounted reel 40 is fixed to the reel support seat 3 of the shaft 2, and the ends of the reel foot 40a are gripped in the reel support rings 26, 27 presented previously. Otherwise, it is obvious that a top-mounted reel may also be connected to the fishing rod according to FIG. 25, for which handle-fixing with the locknut 5, the locknut 5 is in the rear terminal position tightened up against the façade face of the cylindrical handle 1a, as illustrated in FIG. 25, while FIG. 26 illustrates the front terminal position, where the entire length 12 of the section 4b of the shaft 4 has been utilised, see also FIG. 24, for extending the rod, in other words only the section $l_1$ of the shaft 4 is connected to the internal thread 12a of the seat 3, which, however, is dimensioned so that the fixing is completely secure.

Figure 25:
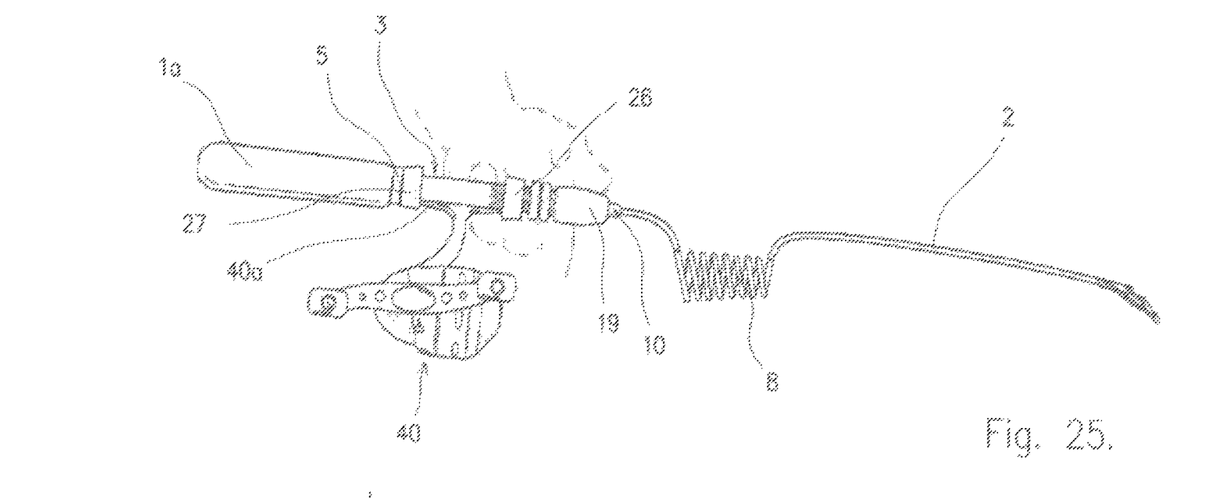
FIGS. 25 and 26 show a fishing rod with bottom-mounted reel with a handle according to FIG. 24 with the reel support seat in two terminal positions as compared to the handle.
Figure 26:
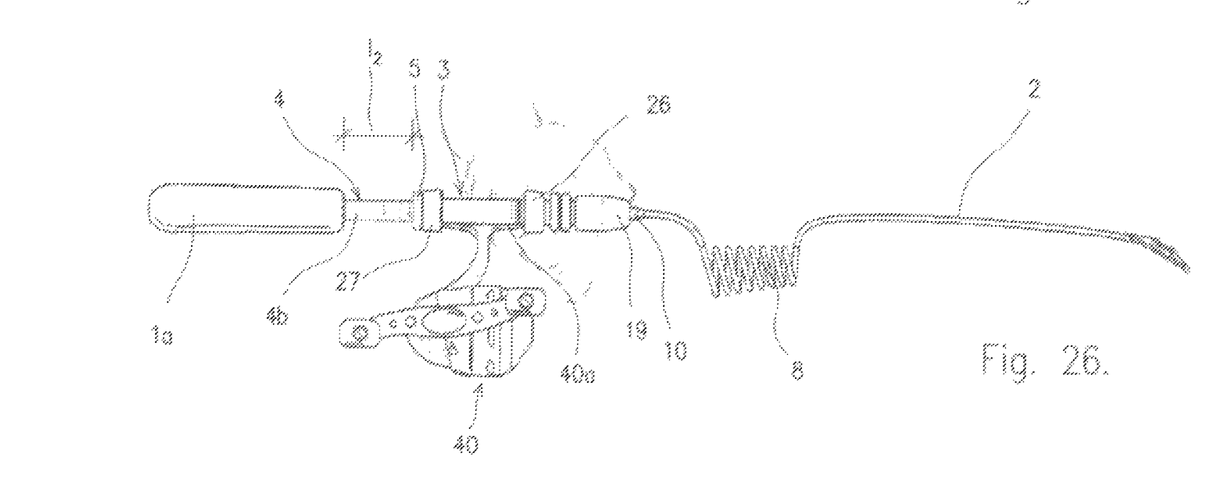

It should be emphasised that the length of the handle 1a may be set as desired between the terminal positions visible in FIGS. 25 and 26, between the value of $l_2$ and zero, the extension depends on how much of the threaded shaft 4 is screwed into the seat 3. Using the locknut 5 the desired handle 1a extension can be completely securely fixed.

Distribution of the fishing rod according to the invention may take place with several types of spring shaft 2, among which there are no great weight differences, however, the reel 40 being currently used may greatly influence the balance of the fishing rod, which can be adjusted to the optimal value with the adjustable length handle 1a (and this reveals possibilities for the use of longer spring shafts 2 as well). Well-adjusted balance has great significance especially in the case of spin fishing, when the angler holds the rod continuously. But good balance is also important during casting and reeling. In general a fishing rod has good balance if the centre of balance falls at the very front of the reel 40 being currently used. This status can be achieved by the angler placing the rod with reel attached onto his finger at a height equal to the location of the front of the reel, and if the rod does not tip over, it is balanced. This optimal status may be achieved by changing the free length 12 of the threaded shaft 4 of the handle 1a.

The preferable effects linked to the invention are the following:

the fact that the fishing rod according to the invention makes it possible to attach both top-mounted and bottom-mounted front drag reels widely used in European angling, it is suitable for both "casting" angling and "spinning" angling. This is a consequence of that all part-units, components and elements of the fishing rod may be fixed to the other components with a releasable connection, i.e. it is a modular system, multifunction fishing rod, within the same system and between practical limits any number of types of handle and shaft may be used, the latter of which may be of varying flexibility, therefore it can be used as various types of rod. Its mechanical features may be influenced by the length, diameter and number of spring coils of the shaft generally made from stainless steel. The casting distance of the fishing rods according to the invention—depending on weight—complies with that of fishing rods approximately 2.0 m in length.

The fishing rod is compact, it has minimal space demand, its storage and transporting are optimal, it may be assembled and disassembled simply, quickly, and performed even several times during one fishing outing without any difficulty, and it makes it possible to switch from the "casting" system to the "spinning" system. Apart from spin fishing, it may be used to good effect in numerous angling methods.

The invention claimed is:

1. A fishing rod comprising:
a handle (1),
a shaft (2) containing a spring and terminating in a tip top guide,
a reel support seat (3) releasably connected between the handle (1) and the shaft (2), reel support rings (26, 27) located on the reel support seat (3), wherein the reel support seat (3) comprises two longitudinal parallel surfaces (13a, 13b) on opposite sides suitable for accommodating a reel support foot (40a) of the fishing reel,
a trigger (11) comprising a ring portion (42) and a button portion (41) wherein the ring portion includes a generally circular interior opening (44), wherein the circular interior opening (44) includes a planar face (46) and wherein the ring portion (42) is provided with a seating (45) positioned opposite the button (41) and the planar face (46), wherein the planar face (46) is a flat section of the generally circular interior opening (44) of the ring portion (42) which aligns with the longitudinal parallel surface (13b) of the reel support seat and prevents rotational movement of the trigger (11) around the reel support seat (3) but allows longitudinal movement along the reel support seat (3),
wherein the seating (45) is formed to accommodate a reel foot end (40a) of a fishing reel (40), and is configured to releasably fix a reel (40) on the reel support seat (3),
wherein the diameter of the generally circular interior opening (44) is greater than the diameter of the reel support seat (3),
wherein the reel support seat (3) is configured to accommodate both a bottom-mounted fishing reel and a top-mounted fishing reel, and
wherein the trigger (11) is configured to be removably attached to the reel support seat (3) by sliding along the reel support seat (3) and allow for the release of a reel.

2. The fishing rod according to claim 1, wherein a threaded (12a) hole (3a) is established in an end section (12) of the seat (3) facing the handle (1), and the handle (1) has a threaded shaft (4), which by being received into the hole (3a) permits the handle (1) to be removably connected to the seat (3) with a releasable connection.

3. The fishing rod according to claim 1, wherein the reel support rings comprise a first reel support ring (26) and a second reel support ring (27), at the end of the seat (3) positioned toward the handle (1), is positioned the second reel support ring (27) with seatings (33a), (33b) opposite each other at the top and the bottom of the reel support ring facing the shaft (2) which serves to receive an end of the reel support foot (40a); and at the end thereof towards the handle (1) the second reel support ring (27) has an opening (29) for receiving a threaded shaft (4) and a shoulder (29a) surrounding said opening (29).

4. The fishing rod according to claim 3, wherein the length of the threaded shaft (4) of the handle (1a) is selected so that a secure screw connection to the seat (3) can be achieved when shaft (4) is partially received in seat (3).

5. The fishing rod according to claim 4, further comprising a locknut (5) on the threaded shaft (4) which abuts said reel support ring (27) when the threaded shaft (4) is partially received in seat (3).

6. The fishing rod according to claim 1, wherein the ring portion (42) is configured to slide along the seat (3) longitudinally, and the button (41) protrudes downwards from the seat (3).

7. The fishing rod according to claim 1, wherein the reel support rings comprise a first reel support ring (26) and a second reel support ring (27), wherein the first reel support ring (26) is guidable onto the seat (3) and longitudinally movable along the seat (3) and is provided with opposed seatings (38a, 38b) facing the handle (1) and adapted to receive an end of the reel support foot (40a) of the fishing reel (40).

8. The fishing rod according to claim 1, wherein the shaft (2) is received into a cylindrical connection member (10) at the end thereof opposite the tip top guide (7), which connection member is received in an externally threaded (17) end section (14) of the seat (3) and fixed to seat (3) with an internally threaded (21a) fixing sheath (19).

9. The fishing rod according to claim 8, comprising protrusions (10a, 10b) on connection member (10) opposite one another, spaced from the end of the connection member (10), and received into façade surface seatings (15a, 15b) established in a façade surface (15) of the seat (3) facing the shaft (2).

10. The fishing rod according to claim 9, wherein the fixing sheath (19) has an internal guide section (20) passing therethrough with an opening (23) configured to pass the end of the connection member (10) with the protrusions to the seat (3) and an internal threaded (21a) fixing section (21) that may be screwed onto the seat (3).

11. The fishing rod according to claim 1, further comprising a flexible auxiliary line guide ring (9) that may be attached to the spring (8) on the outside closing off the gaps between the spring coils (8a).

12. The fishing rod according to claim 1, wherein the reel support seat (3) further comprises a groove (16) positioned along the central section of the reel support seat (3) and the cylindrical side surfaces of the seat (3) running from this groove (16) up to a façade surface (15) have outside threads (17) that run between the upper and lower planar faces (13a), (13b) established along the entire length of the seat (3).

\* \* \* \* \*